United States Patent [19]

Rohringer

[11] Patent Number: 4,508,581
[45] Date of Patent: Apr. 2, 1985

[54] METHOD FOR PRODUCING LINING PANELS WHICH ARE CAST INTO CONCRETE AS AN INTEGRAL LINING

[75] Inventor: Ernst Rohringer, Hilgert, Fed. Rep. of Germany

[73] Assignee: Steuler-Industriewerke GmbH, Grenzhausen, Fed. Rep. of Germany

[21] Appl. No.: 356,469

[22] Filed: Mar. 9, 1982

[30] Foreign Application Priority Data

Mar. 10, 1981 [DE] Fed. Rep. of Germany ....... 3108972

[51] Int. Cl.³ .............................................. B29C 27/08
[52] U.S. Cl. ................................... 156/73.1; 156/73.5; 156/73.6; 156/297; 156/580.2
[58] Field of Search ..................... 156/73.1, 73.5, 73.6, 156/297, 303.1, 580.1, 580.2, 580; 52/506

[56] References Cited

U.S. PATENT DOCUMENTS

| | | | |
|---|---|---|---|
| 3,438,825 | 4/1969 | Fidler | 156/73.5 |
| 3,464,102 | 9/1969 | Soloff | 156/73.1 |
| 3,580,793 | 5/1971 | Hewitt | 156/73.5 |
| 3,657,802 | 4/1972 | Delmas | 156/73.1 |
| 3,683,470 | 8/1972 | McMaster et al. | 156/73.1 |
| 3,783,061 | 1/1974 | Hahn | 156/73.1 |

FOREIGN PATENT DOCUMENTS

| | | |
|---|---|---|
| 1479233 | 4/1969 | Fed. Rep. of Germany . |
| 2037074 | 2/1972 | Fed. Rep. of Germany . |
| 2124227 | 11/1972 | Fed. Rep. of Germany . |
| 1102294 | 10/1955 | France . |

Primary Examiner—Michael Wityshyn
Attorney, Agent, or Firm—Kenyon & Kenyon

[57] ABSTRACT

A method of producing large area lining panels (1) composed of thermoplastic material which are used as pouring forms and linings for concrete vessels. On the face of the lining panels (1) that contacts the concrete there are arranged in rows a plurality of affixing knobs (2) also made of thermoplastic material which have a circular or polygonal cross-section with conically inclined surface portions. A plurality of the affixing knobs (2) are simultaneously placed on the lining panel (1) and joined to it by ultrasonic, vibratory or rotational welding. The placing and welding of the affixing knobs (2) singly or simultaneously in groups at a predetermined distance from each other is effected in a continuous succession.

7 Claims, 2 Drawing Figures

METHOD FOR PRODUCING LINING PANELS WHICH ARE CAST INTO CONCRETE AS AN INTEGRAL LINING

TECHNICAL FIELD

The present invention relates generally to a method of producing large area thermoplastic panels having a plurality of affixing knobs arranged to be embedded in a poured concrete structure to be lined. More specifically, the present invention relates to a lining panel having a plurality of affixing knobs where the affixing knobs are arranged in close proximity to each other in rows on the rear of the lining panels, are composed of thermoplastic material and preferably have a circular or polygonal cross-section and optionally undercut and conically inclined surface portions.

BACKGROUND ART

Thermoplastic lining panels are used as chemically resistant, water-tight and gas-tight protection for concrete structures such as large containers, basins, ducts, etc. They are, therefore, subjected to considerable static and dynamic stresses such as movement of liquid, pressure changes, stresses derived from suppressed thermal expansion, etc. Owing to the stresses thus produced in the lining panels, mechanical affixing is necessary for producing a secure union between panels and concrete. This affixing must be such that the above-mentioned stresses can be dissipated by a uniform distribution over the entire surface of the panel into the concrete of the structure lined with the lining panels. This results in a field of forces of repressed stresses which is distributed uniformly over the entire area of the panel and avoids crack-propagating peaks of stress of the type occurring when the union between the panel and the concrete is unevenly distributed.

The magnitude of the stresses occurring in the lining panels also makes it virtually impossible to adhere the lining panels directly onto the concrete. Instead, the rear of the lining panels have to be provided in known manner (German Offenlegungsschriften Nos. 20 37 074 and 21 24 227) with a plurality of affixing knobs which are arranged in close proximity to each other in rows and which have a shape which is adapted to the structural conditions, preferably a circular or polygonal cross-section and undercut inclined running surface portions. The fixing knobs have to be provided in sufficient numbers per unit area to ensure that the stresses between the lining panels and the concrete are distributed uniformly.

Various methods of joining these fixing knobs to the lining panels are known.

In one method (German Offenlegungsschrift No. 21 24 227), large area lining panels composed of thermoplastic materials, which are particularly well suited to such lining purposes and are also inexpensive, are provided on their rear faces with the desired number of affixing knobs of a shape adapted to the structural conditions. To ensure that the joint between the relatively small end face of the knobs and the rear of the panel is able to take up the strong shearing and tensile stresses resulting from the above-mentioned stresses, the affixing knobs, in this method, are poured or injected onto a glass fiber mat which, in turn, has previously been affixed to the rear of the lining panel. The liquid polyester resin from which the affixing knobs are formed penetrates deep into the fabric of the glass fiber mat as the resin is being poured or injected and, after setting, forms with the mat a fracture-proof material which is firmly bonded to the rear of the lining panel.

The need to attach the glass fiber fabric beforehand and the application of optionally divided molds for the knobs to be poured or injected make this method relatively complex. It is also necessary to use three different materials, namely, the actual lining panel composed of thermoplastic, the glass fiber fabric for the glass fiber mat and the liquid plastic for the affixing knobs. Finally, the affixing knobs, which are formed from a liquid thermosetting resin and are no longer workable when heated, represent an obstacle in the hot working of the lining panels into round shapes and the formation of corners, if the affixing knobs are located in the corner region.

According to another known method (German Offenlegungsschrift No. 14 79 233), the above-described necessity of using three different materials can be avoided by producing the affixing elements from strips of material which are pared from the rear of a plastic panel using cutting tools and which are relatively broad in comparison with the thickness of the pared strip. The pared strips are bent around the root of the pared strip still connected to the panel during paring at a steep angle to the plane of the panel. Furthermore, parallel knicks and other knicks intersecting with them are provided. However, the resultant affixing elements are not suitable for conveying into the concrete the forces needed for suppressing stresses in the lining panel as, on the one hand, the root cross-sections of the pared strips are too small for this purpose and, on the other hand, the pared strips themselves are flexible over the height needed for practical fixing in the concrete and are not therefore resistant to bending. This design also hinders the uniform flow of the concrete needed on the surface of the panels and prevents the air from escaping and therefore bubble-free pouring of concrete against the lining panels.

According to another known method (French Pat. No. 11 02 294), lining panels can be produced from thermoplastic materials by extrusion affixing strips which are formed over the length of the rear of the panel and are optionally undercut can be provided and can be split into knob-like portions by the milling of intermediate spaces. It has been found that this method is suitable only for relatively thin thermoplastic panels of 2–3 mm, but not for the panels of 4–10 mm needed in the present method, as rejects are produced owing to the uneven flow of material during extrusion, and unavoidable hollows are formed on the side of the panel opposite the affixing strips. Another disadvantage of these extruded affixing strips lies in the fact that the forces are dissipated along parallel lines and over a relatively narrow striproot width, which obstructs uniform flow of stress inside the panel. If the strips are arranged in very close proximity to each other, there is a risk of the intermediate spaces not being filled by the conventional concrete containing coarse aggregates and of bubbles being formed. However, if the strips are arranged at a large distance from each other, the strips will bulge apart due to expansion, for example, under elevated thermal stresses, and this can lead to fatigue failure during a change of temperature.

It might also be possible to inject the lining panels in one piece together with the affixing knobs. However, the results of such a method are limited to the possible size of the injection mold and the established shape of the affixing knobs and to the distribution of these affixing knobs. Any change would necessitate the production of an expensive new mold. The abovementioned disadvantages (French Pat. No. 11 02 294) of the unavoidable and undesirable hollows due to the uneven distribution of mass on the surface of an extruded panel opposite the affixing knobs would also arise with an injection molded panel.

DISCLOSURE OF INVENTION

It is, therefore, an object of the present invention to provide a method of producing large area thermoplastic lining panels having affixing knobs on the surface of the panels, in which the disadvantages associated with the known methods described above are avoided and the restrictions in use are eliminated.

The object is achieved in that affixing knobs are placed singly or simultaneously in groups on the lining panel and are joined to it by ultrasonic, vibratory or rotational welding. The placing and welding of the affixing knobs singly or in groups at predetermined distances from each other can be effected automatically in a continuous succession. As also proposed by the invention, the knob body having a circular or polygonal cross-section is provided at one end with an attachment plate which enlarges the weld contact face on the lining panel. The knob can be composed of a material which is identical or related to that of the lining panels.

By means of this method, it is possible to provide all shapes of conventional commercial thermoplastic panels of differing thickness and of random dimensions with affixing knobs of any desired shape and distribution over the panel surface. The thermoplastic lining panel is subjected to heat only in the immediate region of contact with the affixing knob so that there is no risk of having to reject the panel owing to the heat of welding as would be the case if it were joined, for example, by butt welding. The distribution of stresses and transmission of stresses takes place, independently of the selected shape of the actual knob body, over a large area of the attachment which enlarges the attachment end of the knob body and which forms the weld contact face on the lining panel.

The invention is described in more detail with reference to the embodiment illustrated in the drawings.

BEST MODE FOR CARRYING OUT THE INVENTION

Figure 1:
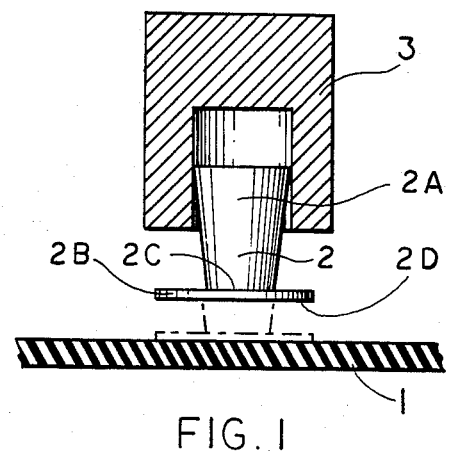
FIG. 1 is a side elevation, partially in section, showing the affixing knobs and the lining panel.

As shown in FIG. 1, the affixing knob 2 is held by a holding device 3, which is designed as an ultrasonic transducer in this case. As the holding device 3 is lowered, the affixing knobs 2 are moved from the position shown in solid lines into the position indicated by chain lines and is welded to the lining panel 1 by the effect of ultrasound. The affixing knobs 2 are supplied from a magazine in known manner, are distributed by means of an apparatus, not shown, to a plurality of stationary or movable holding devices 3, and are placed at variable or fixed intervals from each other on the lining panel. Changing to other forms of fixing knobs requires merely changing the holding devices (transducers), for example, from a device for holding body 2a having a circular cross section to a device for holding a body having a polygonal cross section. The affixing knob 2 is formed at one end face 2c with an attachment plate 2b to enlarge the weld contact face 2d on the lining panel 1, which permits welding by ultrasound, vibration, or frictional rotation and thus produces a large area of connection with the lining panel 1 in relation to the cross-section of the body 2a of the fixing knob 2.

Figure 2:
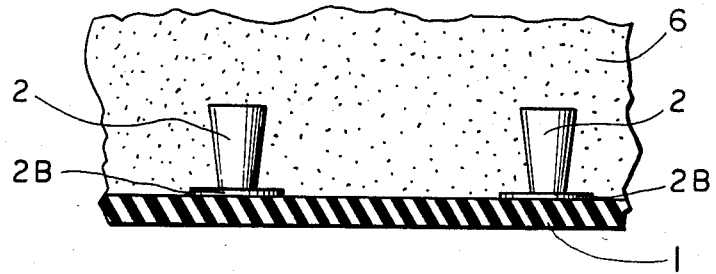
FIG. 2 is a view similar to FIG. 1 showing the lining panel in relation to a poured concrete structure.

The fixing knobs 2 consisting of the knob body 2a and the attachment plate 2b can be produced in various shapes. The knob body 2a must be held firmly in the concrete, and the attachment plate 2b must be relatively large relative to the cross section of the knob body 2a to ensure that the stresses resulting from differential thermal expansion of the concrete and thermoplastic lining panel are transmitted by the embedded knobs uniformly and over a large area, as shown in FIG. 2, which illustrates the finished lining panel 1 provided with fixing knobs 2 embedded, in a cast concrete body 6.

I claim:

1. A method of producing large area lining panels for poured concrete structures, the method comprising the steps of:
    providing a sheet-like panel composed of thermoplastic material, each panel having a front face and a rear face;
    providing a plurality of affixing knobs composed of thermoplastic material, each affixing knob having a body with a first end and a second end and an attachment portion integrally formed at the first end of the body, the attachment portion having a contact surface with an area substantially larger than the cross-sectional area of the first end of the body;
    placing the contact surface of the attachment portion of each affixing knob in contact with the rear face of the panel in predetermined spaced relation to other ones of the plurality of knobs; and
    effecting frictional heating of the immediate region of contact between each affixing knob and the panel sufficient to fuse the contact surface of the knob and the contacted surface of the panel to weld the affixing knobs to the panel, whereby the enlarged attachment portion of each knob is adapted to distribute shear and tension forces exerted between the knob and the panel, when the knob is embedded in a poured concrete structure abutting the rear face of the panel, over a weld area greater than the cross-sectional area of the first end of the knob.

2. A method according to claim 1 wherein said step of effecting frictional heating of the immediate region of contact between each knob and the rear face of the panel comprises applying ultrasonic energy to the body of the knob.

3. A method according to claim 1 wherein said step of effecting frictional heating of the immediate region of contact between each knob and the rear face of the panel comprises applying vibrational energy to the body of the knob.

4. A method according to claim 2 or 3, the method including the step of holding the body of each affixing knob in a transducer device upon placing the affixing knobs in contact with the panel.

5. A method according to claim 1 wherein said step of effecting frictional heating of the immediate region of contact between each knob and the rear face of the panel comprises rotating the knob while the contacting surface is in contact with the rear face of the panel.

6. A method according to claim 1 wherein the steps of placing the knobs on the panel and effecting frictional heating of the immediate region of contact between each knob and the rear face of the panel are accomplished automatically in continuous succession.

7. A method according to claim 1 wherein the material of the knobs is identical to the material of the panel.

* * * * *